(12) United States Patent
Kim et al.

(10) Patent No.: US 9,029,005 B2
(45) Date of Patent: May 12, 2015

(54) BATTERY MODULE STRUCTURE

(75) Inventors: Jinwook Kim, Seoul (KR); Saheum Kim, Gyeonggi-do (KR); Byungjo Jeong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 947 days.

(21) Appl. No.: 13/172,235

(22) Filed: Jun. 29, 2011

(65) Prior Publication Data

US 2012/0135295 A1 May 31, 2012

(30) Foreign Application Priority Data

Nov. 30, 2010 (KR) .................... 10-2010-0120652

(51) Int. Cl.
| | |
|---|---|
| *H01M 2/20* | (2006.01) |
| *H01M 2/26* | (2006.01) |
| *H01M 2/10* | (2006.01) |
| *H01M 2/30* | (2006.01) |

(52) U.S. Cl.
CPC .......... *H01M 2/202* (2013.01); *Y10T 29/49947* (2013.01); *H01M 2/1061* (2013.01); *H01M 2/1072* (2013.01); *H01M 2/204* (2013.01); *H01M 2/206* (2013.01); *H01M 2/266* (2013.01)

(58) Field of Classification Search
CPC .................. H01M 2/2002–2/206; H01M 6/46; H01M 2/266; H01M 2/1061
See application file for complete search history.

(56) References Cited

U.S. PATENT DOCUMENTS

| | | | |
|---|---|---|---|
| 6,365,297 B1* | 4/2002 | Wolczak et al. | 429/159 |
| 7,276,313 B2 | 10/2007 | Watanabe et al. | |
| 2002/0190522 A1 | 12/2002 | Grepaly et al. | |
| 2003/0190522 A1* | 10/2003 | Ogata | 429/179 |
| 2005/0250386 A1* | 11/2005 | Kim | 439/627 |
| 2006/0270286 A1* | 11/2006 | Zhao et al. | 439/840 |
| 2009/0075163 A1* | 3/2009 | Shevock et al. | 429/121 |
| 2011/0195296 A1* | 8/2011 | Kim et al. | 429/151 |
| 2011/0229754 A1* | 9/2011 | Zhao et al. | 429/158 |

FOREIGN PATENT DOCUMENTS

| | | |
|---|---|---|
| JP | 2003 297334 | 10/2003 |
| JP | 2010 61962 | 3/2010 |
| KR | 10 2005 0106541 | 11/2005 |
| KR | 10 2006 0118798 | 11/2006 |
| KR | 10 2007 0006956 | 1/2007 |
| KR | 10 2007 0043496 | 4/2007 |
| KR | 10 2009 0096732 | 9/2009 |

* cited by examiner

*Primary Examiner* — Edu E Enin-Okut
(74) *Attorney, Agent, or Firm* — Mintz Levin Cohn Ferris Glovsky and Popeo, P.C.; Peter F. Corless

(57) ABSTRACT

Disclosed is a battery module structure including unit cells having positive and negative cell taps at an edge each unit cell to induce electricity, a plurality of receptacles respectively coupled to cell taps of unit cells, and a plurality of bus bars electrically connecting receptacles. Advantageously, the present invention, ensures a stable connection between the unit cells, makes manufacturing and assembling easy, ensures high durability, allows for implementation of various shapes and structures of the battery modules, and freely determines the arrangement structure and the number of the unit cells in various ways.

2 Claims, 6 Drawing Sheets

BATTERY MODULE STRUCTURE

CROSS-REFERENCE TO RELATED APPLICATIONS

The present application claims priority to Korean Patent Application Number 10-2010-0120652 filed Nov. 30, 2010, the entire contents of which application is incorporated herein for all purposes by this reference.

BACKGROUND OF THE INVENTION

1. Field of the Invention

The present invention relates to a battery module structure, and more particularly, to a structure having battery modules implemented by electrically connecting unit cells.

2. Description of Related Art

Battery modules cannot achieve sufficient capacity and voltage with only one unit cell, such that they have to be implemented by connecting a plurality of unit cells, and a structure making it possible to electrically connect the unit cells, are required in order to achieve sufficient capacity and voltage within the battery modules.

Connecting the unit cells, as described above, should be able to ensure stable electric connection and make it possible to easily manufacture and assemble the unit cells and ensure durability.

Further, the battery modules are typically implemented in various shapes and structures, depending on the use or location of the battery modules. Therefore, it would be beneficial for a structure connecting the unit cells to be able to be easily applied to battery modules having various structures and flexible in its arrangement structure and the number of the unit cells which it can hold.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

The present invention has been made in an effort to provide a battery module structure that electrically connects unit cells such that a stable connection between the unit cells can be ensured, manufacturing and assembling can be done in a more efficient manner, high durability can be ensured, the structure can be easily used for various shapes and structures of battery modules, and the arrangement structure and the number of the unit cells can be freely determined in various ways.

An exemplary embodiment of the present invention provides a battery module structure, including unit cells having positive and negative cell taps at an edge to induce electricity; a plurality of receptacles respectively coupled to the cell taps of the unit cells, and a plurality of bus bars electrically connecting the receptacles.

Advantageously, in the illustrative embodiment of the present invention, a stable connection between the unit cells is ensured, manufacturing and assembling is made easier, high durability is ensured, the structure can be easily used for various shapes and structures of battery modules, and the unit cells can be electrically connected while freely determining the arrangement structure and the number of the unit cells in various ways.

The methods and apparatuses of the present invention also has other features and advantages which will be apparent from or are set forth in more detail in the accompanying drawings, which are incorporated herein, and the following Detailed Description of the Invention, which together serve to explain certain principles of the present invention.

Figure 1:
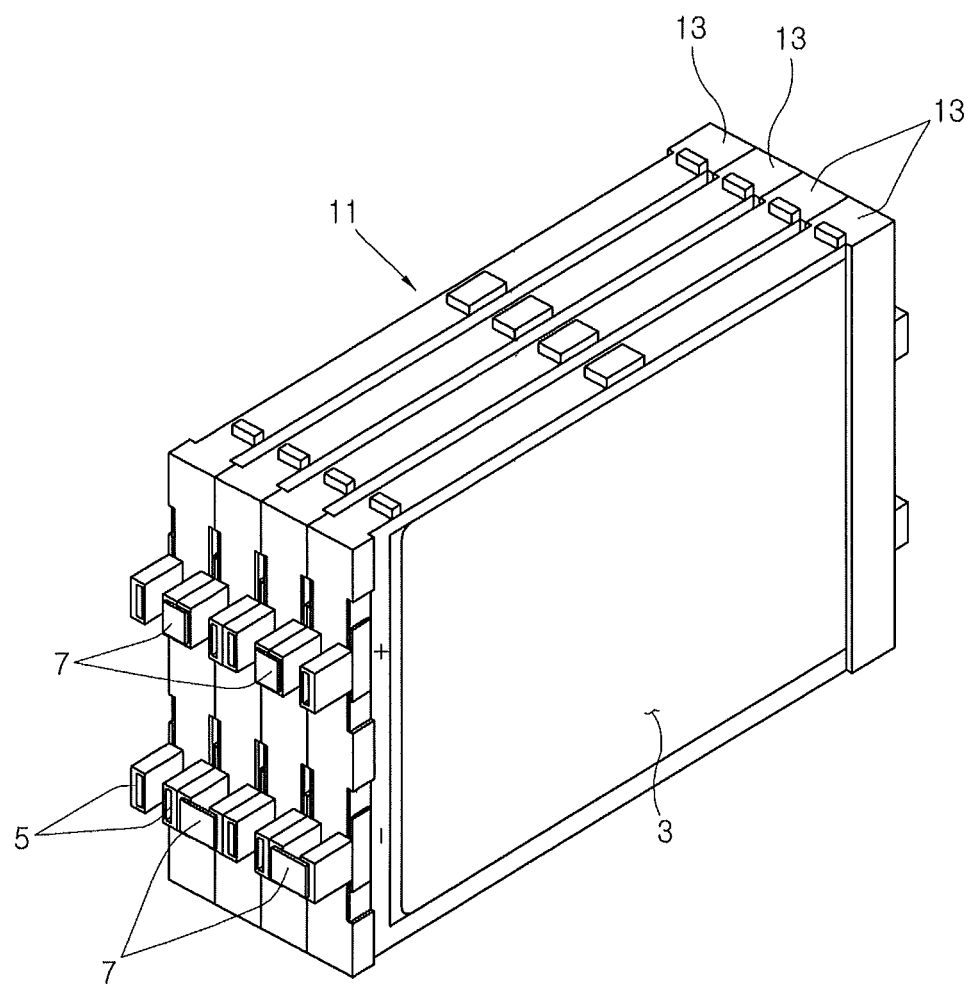
FIG. 1 is a view showing an example of a battery module structure according to an exemplary embodiment of the present invention.
Figure 2:
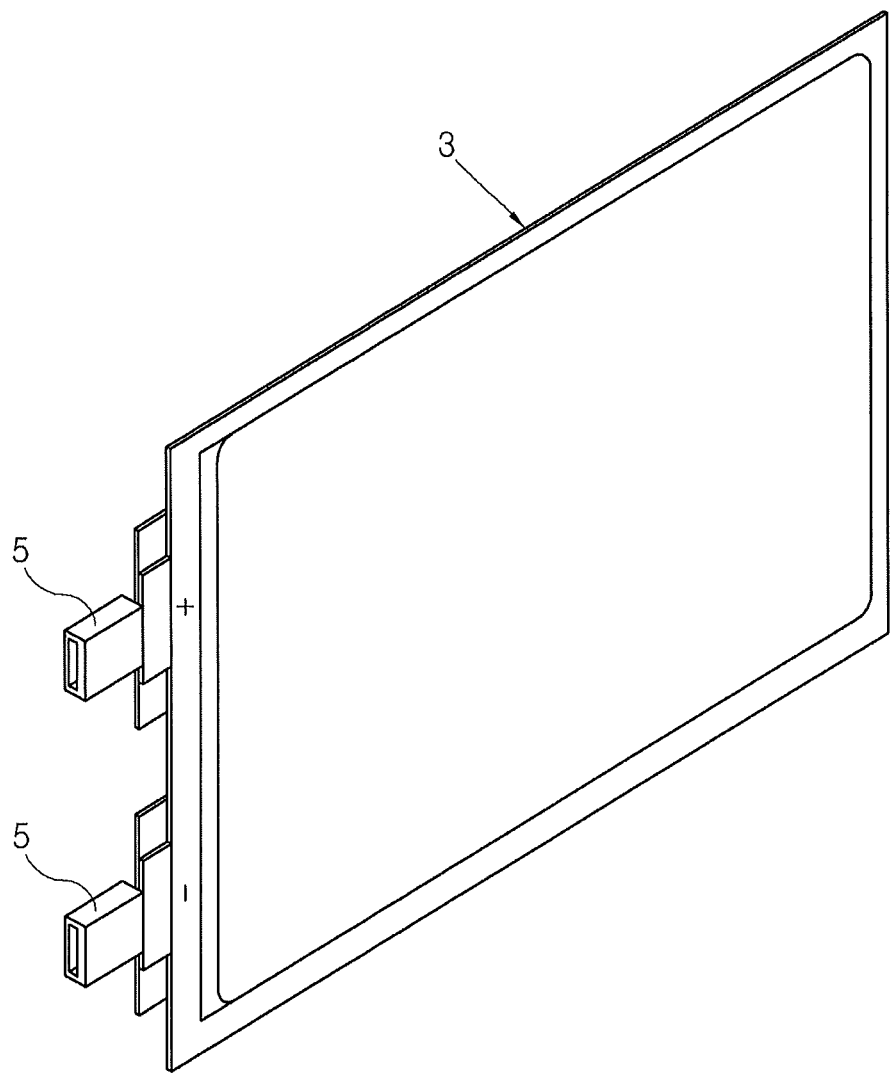
FIG. 2 is a view showing the structure of an unit cell included in the battery module according to an exemplary embodiment of the present invention.
Figure 3:
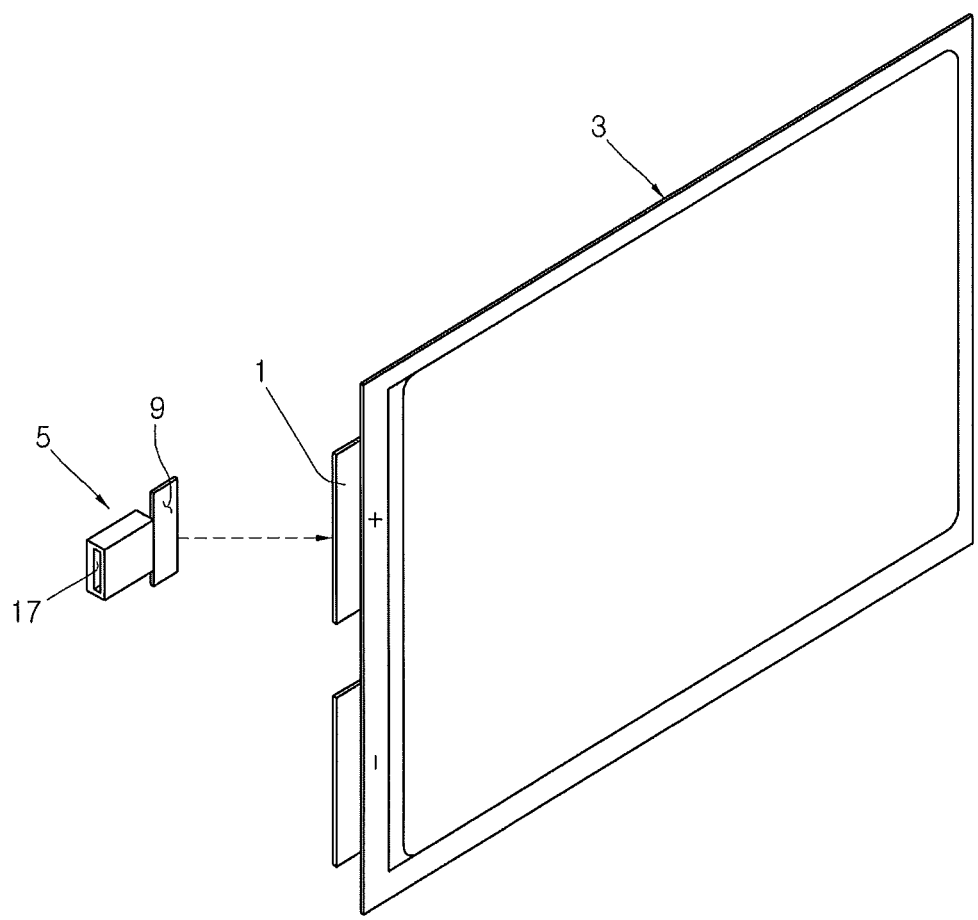
FIG. 3 is a view illustrating when a receptacle shown in FIG. 2 is separated.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIGS. 1 to 4, a battery module structure according to an exemplary embodiment of the present invention includes a plurality of unit cells 3 each having positive and negative cell taps 1 at the edge of each unit cell 3 to induce electricity, a plurality of receptacles 5 coupled to the cell taps 1 of each of the unit cells 3, and a plurality of bus bars 7 electrically connecting the receptacles 5.

Cell tap 1 of a unit cell 3 is formed in a plate shape protruding from a side of the unit cell 3 and the receptacle 5 has a connecting surface 9 which connects to and is in surface contact with the cell tap 1 protruding in a plate shape.

That is, a battery module 11 can be achieved by coupling receptacles 5 to cell taps 1 of each of the unit cells 3, using welding or soldering while ensuring electric connection, and connecting the receptacles 5 of the unit cells 3 through the bus bars 7.

Figure 4:
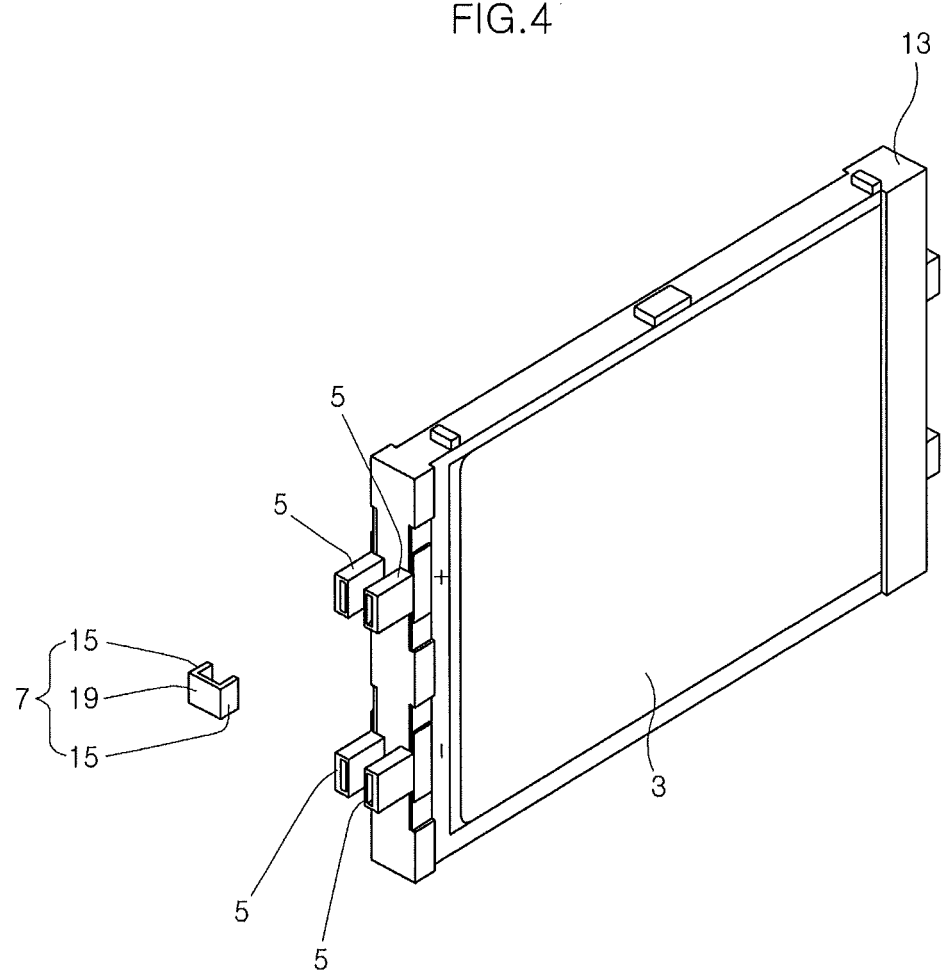
FIG. 4 is a view showing when a bus bar is coupled to and separated from a unit frame such that the unit cells shown in FIG. 2 constitute a battery module.

The battery module 11 shown in FIG. 1 is achieved by placing the unit cell 3 inside a unit frame 13, as shown in FIG. 4, and then overlapping a plurality of unit frames 13.

In the exemplary embodiment, the receptacle 5 has a groove 17 that is open perpendicular to the plane made by the unit cell 3 such that an inserting portion 15 of the bus bar 7 is inserted into the groove 17 and electrically connected in the parallel direction with the plane made by unit cell 3, which is achieved by various types of sockets known in the art. Thus, the reliability of the electric connection structure implemented by inserting the bus bar 7 into the receptacle 5 has been sufficiently verified.

Further, bus bar 7 has a body 19 that connects the inserting portions 15. The inserting portions 15 bend, at both sides, from body 19 at the right angle toward the groove 17 of the receptacles 5.

Therefore, according to the structure of battery module 11 having the configuration described above, it is possible to ensure stable electric connection without specifically changing the shape of the cell taps 1 of each of the unit cells 3. Accordingly, the manufacturing process is more efficient and less costly. Furthermore, cracks due to shape changes are less likely to occur in unit cells 3. Thus, durability is further improved.

Figure 5:
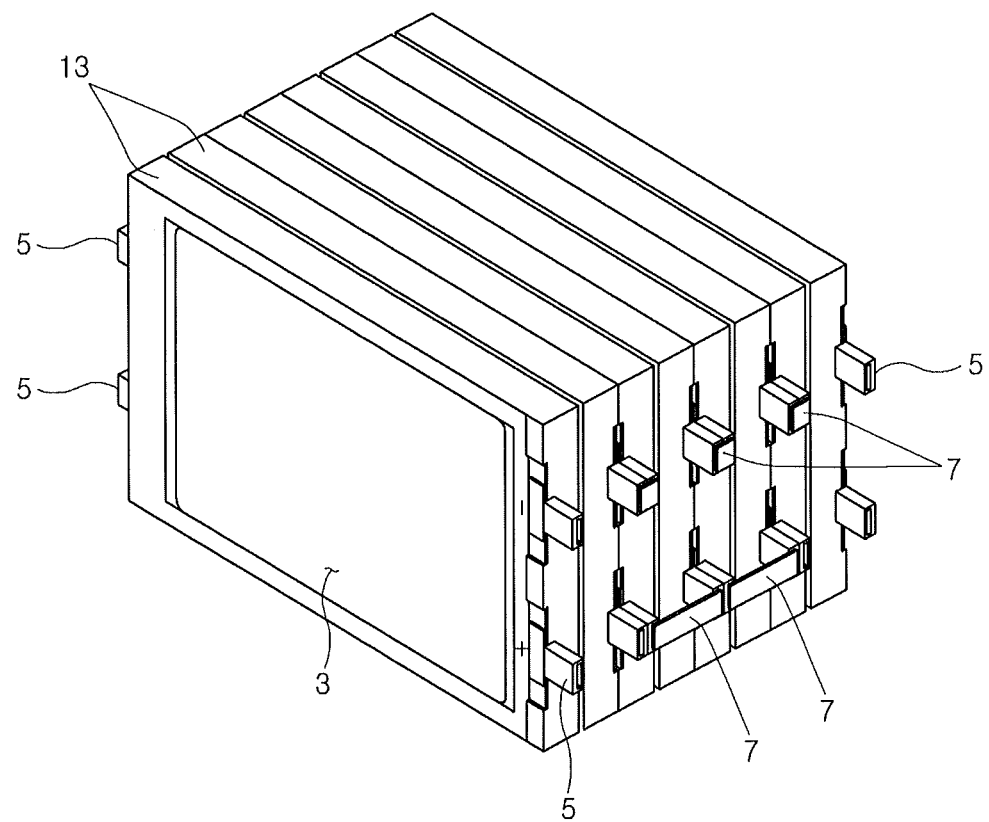
FIGS. 5 and 6 are views showing examples when unit cells according to an exemplary embodiment of the present invention are coupled in various ways.
Figure 6:
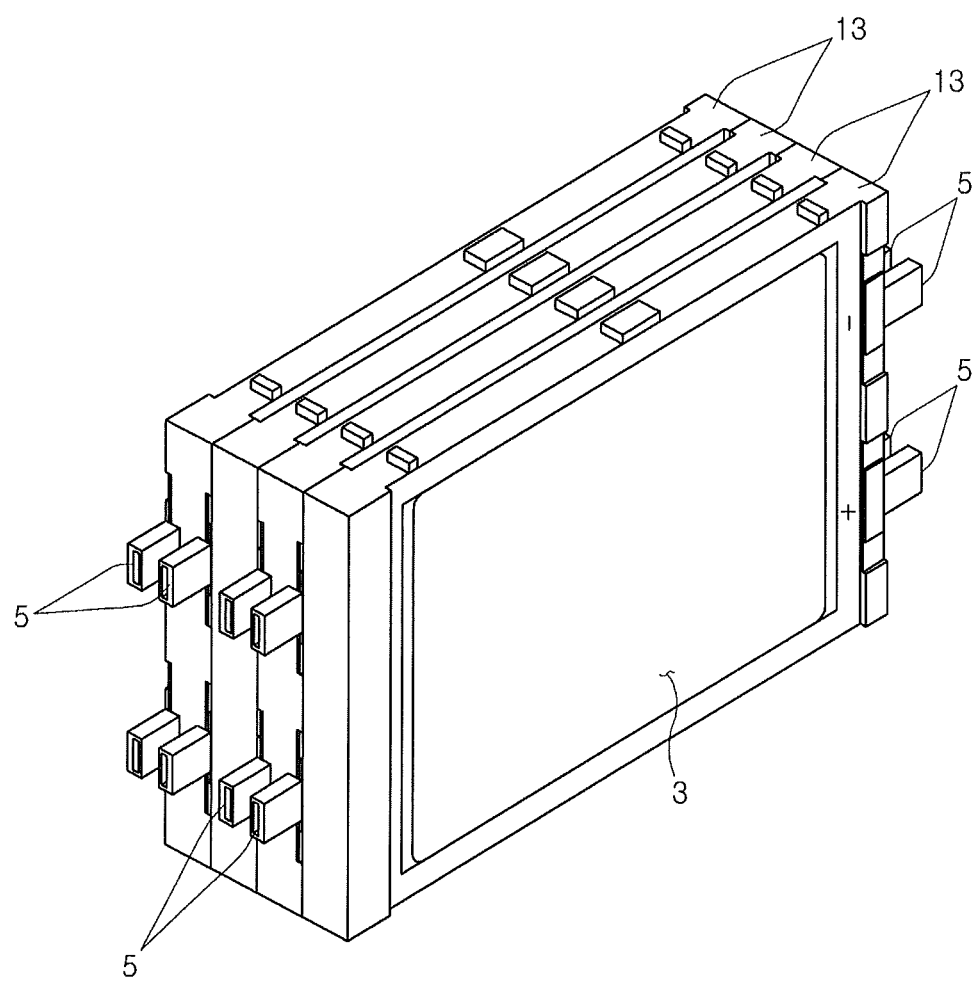

Further, the cell taps 1 of each of the unit cells 3 are not directly connected by, for example, welding or bolts or nuts, in order to be electrically connected. Instead, the unit cells 3 can be easily connected and disconnected by attaching/detaching bus bars 7, such that the number and arrangement of unit cells 3 can be freely selected. The unit cells may be freely arranged, for example, as shown in FIGS. 5 and 6 in which the unit cells are arranged in the same direction and opposite directions, or two unit cells may be alternately arranged.

Even further, the structure of battery module 11 of the present invention is relatively thinner than conventional module types and thus is very advantageous in implementing a pouch type of battery module having a flexible outer cover.

Further, the receptacles 5 described above may be coated with a nonconductive substance, so that the cell taps 1 are not exposed to the outside in a working environment and the short circuiting is thus prevented, thereby considerably improving safety.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A battery module structure, comprising:
   a plurality of unit cells having positive and negative cell taps at an edge of each of the unit cells of the plurality of unit cells to induce electricity;
   a plurality of receptacles respectively coupled to the cell taps of the unit cells, wherein the receptacles each include a groove; and
   a plurality of bus bars electrically connecting the receptacles, wherein the bus bars do not connect with one another,
   wherein the groove is open perpendicular to a plane made by the unit cell such that inserting portions of the bus bar are inserted into the grooves in the receptacles and electrically connected in the parallel direction of a plane made by the unit cell, and
   the bus bar has a body formed in the overlapping direction of unit cells, and the inserting portions at both sides bend at the right angle toward the grooves of the receptacles from the body.

2. The battery module structure of claim 1, wherein the cell taps of the unit cell are formed in a plate shape protruding from a side of the unit cell and the receptacle has a connecting surface that is in surface contact with the cell tap protruding in the plate shape.

* * * * *